US012085333B2

(12) United States Patent
Cahill et al.

(10) Patent No.: US 12,085,333 B2
(45) Date of Patent: Sep. 10, 2024

(54) SEMI-PASSIVE COOLING USING HIERARCHICAL VASCULATURE

(71) Applicant: LAWRENCE LIVERMORE NATIONAL SECURITY, LLC, Livermore, CA (US)

(72) Inventors: James T. Cahill, Livermore, CA (US); Swetha Chandrasekaran, Dublin, CA (US); Wyatt L. Du Frane, Livermore, CA (US); Joshua D. Kuntz, Livermore, CA (US); Richard L. Landingham, Livermore, CA (US); Ryan Lu, Daly City, CA (US); Christopher M. Spadaccini, Oakland, CA (US); Amy Wat, Oakland, CA (US); Seth E. Watts, Collingswood, NJ (US); Marcus A Worsley, Hayward, CA (US)

(73) Assignee: Lawrence Livermore National Security, LLC, Livermore, CA (US)

( * ) Notice: Subject to any disclaimer, the term of this patent is extended or adjusted under 35 U.S.C. 154(b) by 993 days.

(21) Appl. No.: 17/014,756

(22) Filed: Sep. 8, 2020

(65) Prior Publication Data

US 2022/0074639 A1 Mar. 10, 2022

(51) Int. Cl.
*F25D 7/00* (2006.01)
*F25D 3/00* (2006.01)

(52) U.S. Cl.
CPC ............. *F25D 7/00* (2013.01); *F25D 3/00* (2013.01); *F25D 2303/08222* (2013.01); *F25D 2303/084* (2013.01)

(58) Field of Classification Search
CPC . F01D 5/182; F01D 5/183; F25D 3/00; F25D 7/00; F25D 2303/084; B64C 1/38; B64C 21/02; F28D 5/00; F28C 3/005
See application file for complete search history.

(56) References Cited

U.S. PATENT DOCUMENTS

| | | | |
|---|---|---|---|
| 2,468,820 A * | 5/1949 | Goddard | F42B 15/34 60/915 |
| 3,138,009 A | 6/1964 | McCreight | |
| 3,210,233 A | 10/1965 | Kummer et al. | |
| 3,796,616 A | 3/1974 | Northway | |
| 3,883,096 A * | 5/1975 | Osofsky | B64C 1/38 62/239 |
| 4,031,059 A | 6/1977 | Strauss | |

(Continued)

OTHER PUBLICATIONS

Daniel J. Rasky, PhD, "A Perspective on the Design and Development of the SpaceX Dragon Spacecraft Heatshield," Feb. 2012, pp. 1-51.
Driver et al., "Improved Predictions of PICA Recession in Arc Jet Shear Tests," 49th AIAA Aerospace Sciences Meeting, Jan. 2011, pp. 1-16.

(Continued)

*Primary Examiner* — Frantz F Jules
*Assistant Examiner* — Martha Tadesse
(74) *Attorney, Agent, or Firm* — HARNESS, DICKEY & PIERCE, P.L.C.

(57) ABSTRACT

A semi-passive cooling system for a component exposed to a fluid flow utilizes a hierarchical vasculature and a sacrificial transpirant to cool the component. The component includes a body that defines a transpirant reservoir and the hierarchical vasculature. The transpirant is configured to transition between a solid phase and a vapor phase over an operating temperature range of the component.

20 Claims, 8 Drawing Sheets

(56) References Cited

U.S. PATENT DOCUMENTS

| | | | |
|---|---|---|---|
| 4,100,322 A | | 7/1978 | Seibold et al. |
| 5,359,850 A | | 11/1994 | Prescott |
| 5,672,389 A | | 9/1997 | Tran et al. |
| 6,207,230 B1 | | 3/2001 | Ohya et al. |
| 6,558,785 B1 | | 5/2003 | Rawal et al. |
| 6,955,853 B1 | | 10/2005 | Tran et al. |
| 9,920,530 B2 | * | 3/2018 | Wadley .................. F01D 5/147 |
| 11,352,120 B2 | * | 6/2022 | Rathay ...................... B64C 1/38 |
| 11,427,330 B2 | * | 8/2022 | Rathay ...................... B64C 1/38 |
| 11,535,360 B1 | * | 12/2022 | Roper .................. F28D 15/046 |
| 2021/0147060 A1 | * | 5/2021 | Sommerer ................ B64C 1/38 |
| 2021/0147087 A1 | * | 5/2021 | Gerstler .................... B64C 1/38 |

OTHER PUBLICATIONS

Elwan et al., "Preparation and Ablation Performance of Lightweight Phenolic Composite Material under Oxyacetylene Torch Environment," J. Aerospace Technol. Manag., vol. 10, 2018, pp. 1-19.

Bogard, "The Gas Turbine Handbook," Department of Energy, National Energy Technology Laboratory, 2006, 14 pp.

Huang et al., "Biomimetic self-pumping transpiration cooling for additive manufactured porous module with tree-like microchannel," International Journal of Heat and Mass Transfer, vol. 131, 2019, pp. 403-410.

Murthy et al, "Flow and Heat Transfer Characteristics Over Naca0018 Aerofoil," International Journal of Engineering Research & Technology (IJERT), vol. 1 Issue 9, 2012, pp. 1-13.

Reimer et al., "Transpiration Cooling Tests of Porous CMC in Hypersonic Flow," 17th AIAA International Space Planes and Hypersonic Systems and Technologies Conference, 2011, pp. 1-13.

* cited by examiner

SEMI-PASSIVE COOLING USING HIERARCHICAL VASCULATURE

The United States Government has rights in this invention pursuant to Contract No. DE-AC52-07NA27344 between the United States Department of Energy and Lawrence Livermore National Security, LLC for the operation of Lawrence Livermore National Laboratory.

FIELD OF THE INVENTION

The present invention relates to semi-passive cooling and more particularly to semi-passive cooling using a sacrificial transpiration flowing through a hierarchical vasculature.

BACKGROUND

Oftentimes, components exposed to a fluid flow are subjected to undesirable heating. For example, aircraft are subjected to aerodynamic heating during atmospheric flight. If the heating exceeds the natural radiative and conducting cooling of the component melting or ablation of an outer material of the component can occur.

In some approaches, exotic materials or superalloys have been used to construct the components so that the components are able to withstand the heating. For example, turbine blades are often constructed from exotic materials that can withstand aerodynamic heating. Those exotic materials are often expensive and can be difficult, or even dangerous, to manufacture.

Cooling mechanisms have been incorporated into components to provide cooling that allow the components to maintain structural integrity during heating and to survive the harsh environmental conditions. Those cooling mechanisms have generally been constructed as either passive or active systems. Examples of passive cooling systems include heat pipe and ablation surfaces. A heat pipe is a closed system that contains a working fluid. The working fluid is alternatively heated and cooled between a hot region and a cooler region and driven by vaporization, condensation, and wicking. The effectiveness of heat pipes is generally limited to narrow operating temperature ranges and heat pipes often require significant thermal gradient for proper operation. Furthermore, it can be difficult to incorporate a heat pipe structure into narrow or complex geometries.

Ablation surfaces can also be used as passive cooling systems. In particular, an ablation surface provides a surface material that is shed when the surface material is heated. The shed surface material carries thermal energy away as the surface material erodes. Ablation surfaces are generally limited to applications in which intense heat flux is applied over short durations and on components where a significant change in shape is acceptable.

Active cooling systems have also been used to provide cooling. For example, active systems have generally utilized inert gases or water as a working fluid that is actively driven through the system, such as by a compressor or pump. Accordingly, the active systems have required significant operation energy input while requiring large volumes of coolant, and while including components that often require service.

A cooling system must provide efficient heat transfer to a body that is exposed to a fluid flow and resulting heat flux, while providing high reliability and reduced complexity. Thus, it would be desirable to create a semi-passive cooling system that can be integrated into a component that provides efficient heat transfer and high reliability.

SUMMARY

A semi-passive cooling system is described that utilizes latent heat of transformation to provide efficient cooling in a component exposed to a fluid flow. The semi-passive cooling system can be used to cool portions of aircraft that experience undesirable aerodynamic heating during atmospheric flight. The semi-passive cooling system includes a sacrificial transpirant that is driven through a hierarchical vasculature using capillary pressure.

A semi-passive cooling system for a component exposed to fluid flow and heat flux, according to an embodiment, includes a body and a sacrificial transpirant. The body defines an outer surface, a transpirant reservoir, and a hierarchical vasculature. The hierarchical vasculature extends from the transpirant reservoir and through at least a portion of the outer surface. The sacrificial transpirant is disposed in the transpirant reservoir in a solid phase, and is configured to transition between the solid phase and a vapor phase over an operating temperature range of the component.

A semi-passive cooling system for a component exposed to a fluid flow and aerodynamic heating, according to another general embodiment, includes a body and a sacrificial transpirant. The body defines an outer surface, a transpirant reservoir, and a hierarchical vasculature. The hierarchical vasculature extends between the transpirant reservoir and at least a portion of the outer surface, and intersects the outer surface at a plurality of outlets. The sacrificial transpirant is disposed in the transpirant reservoir in a solid phase, and is configured to transition between the solid phase and a vapor phase over a temperature gradient extending over the hierarchical vasculature caused by the aerodynamic heating. The outlets are located so that a capillary pressure of a liquid phase of the transpirant at the outlets is greater than a fluid pressure exerted on the outer surface by the fluid flow.

A method of making a semi-passive cooling system in a component, according to another general embodiment, includes forming a body from a first material, and filling a transpirant reservoir with a sacrificial transpirant in a solid phase. The body includes the transpirant reservoir and an outer surface, and defines a hierarchical vasculature extending between the transpirant reservoir and the outer surface. The transpirant is configured to transition between the solid phase and a vapor phase over an operating temperature range of the component.

Other aspects and advantages of the present invention will become apparent from the following detailed description, which, when taken in conjunction with the drawings, illustrate by way of example the principles of the invention.

BRIEF DESCRIPTION OF THE DRAWINGS

For a fuller understanding of the nature and advantages of the present invention, as well as the preferred mode of use, reference should be made to the following detailed description read in conjunction with the accompanying drawings.

DETAILED DESCRIPTION

I. Introduction

The following description is made for the purpose of illustrating the general principles of the present invention and is not meant to limit the inventive concepts claimed herein. Further, particular features described herein can be used in combination with other described features in each of the various possible combinations and permutations.

Unless otherwise specifically defined herein, all terms are to be given their broadest possible interpretation including meanings implied from the specification as well as meanings understood by those skilled in the art and/or as defined in dictionaries, treatises, etc.

It must also be noted that, as used in the specification and the appended claims, the singular forms "a," "an" and "the" include plural referents unless otherwise specified. The term "about" as used herein indicates the value preceded by the term "about," along with any values reasonably close to the value preceded by the term "about," as would be understood by one of skill in the art. When not indicated otherwise, the term "about" denotes the value preceded by the term "about"±10% of the value. For example, "about 10" indicates all values from and including 9.0 to 11.0.

II. Example Embodiments

The following description discloses several preferred structures that include semi-passive cooling systems for cooling a component structure when it is exposed to a fluid flow. The semi-passive cooling system is configured to utilize a sacrificial transpirant, or working fluid, to cool at least portions of the component structure when the component is exposed to a fluid flow. In the semi-passive cooling system, a solid phase of the sacrificial transpirant is disposed in a reservoir. The transpirant is selected so that over a target operating temperature range the transpirant transitions from the solid phase, into a liquid phase, and into a vapor phase. As a result, the sacrificial transpirant is selected to take advantage of the latent heat of transformation required for two phase changes during the operation of the semi-passive cooling system.

The cooling system described herein is a semi-passive system that utilizes natural phenomenon such as wetting properties of a material and capillary pressure to drive movement of the transpirant. The sacrificial transpirant can be driven by capillary pressure through a hierarchical vasculature from the reservoir to an outer surface of the structure where the transpirant is carried away by the fluid flow.

Figure 1:
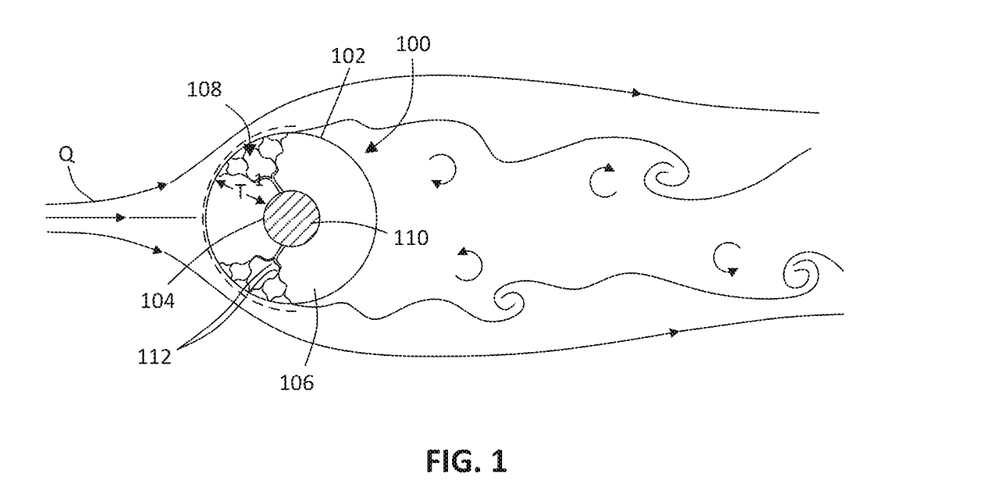
FIG. 1 is a schematic view of a component including a semi-passive cooling system in in a fluid flow in accordance with an embodiment.
Figure 2:
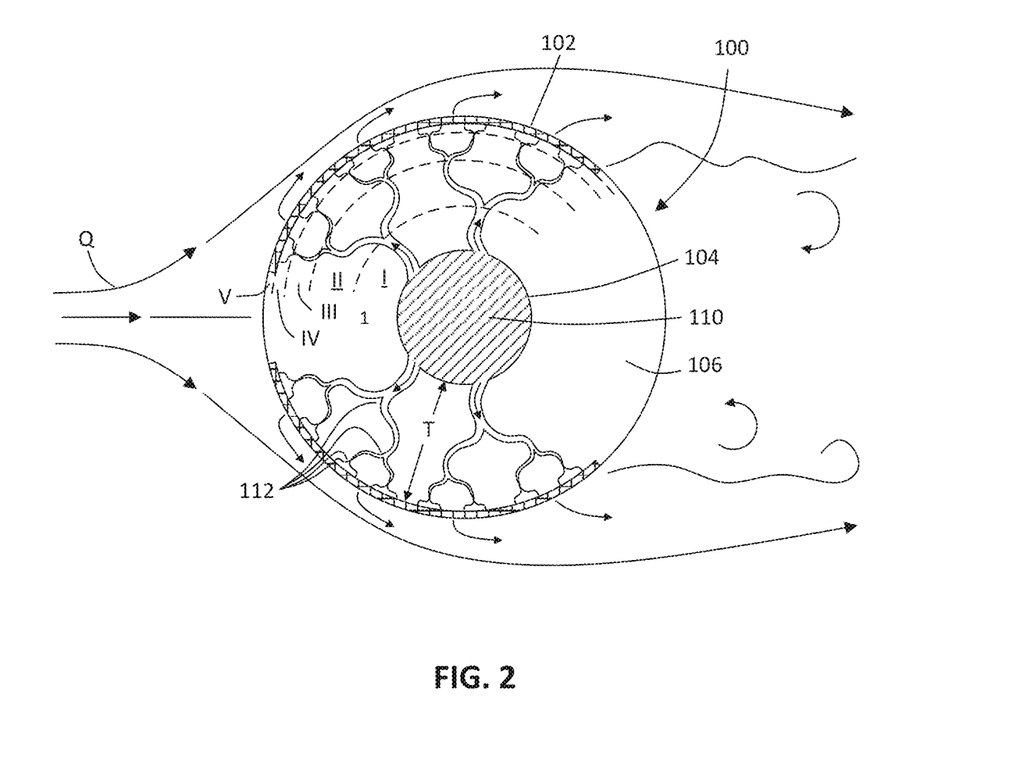
FIG. 2 is another schematic view of the component of FIG. 1 in a fluid flow.

Referring to FIGS. 1 and 2, an exemplary component, such as a sensor, including an embodiment of the semi-passive cooling system is shown. The component includes a body 100 that defines an outer surface 102 and a reservoir 104.

The component is positioned so that the outer surface 102 is directly exposed to a fluid flow Q. The fluid flow Q travels over the component and applies pressure to the outer surface 102 and generates heat flux $\varphi_q$ in at least a portion of the body 100. A portion of a wall 106 of the body 100 extends between the reservoir 104 and the outer surface 102. The wall 106 is constructed to define a hierarchical vasculature 108 that extends between the reservoir 104 and the outer surface 102 to form pathways for a sacrificial transpirant 110 disposed in the reservoir 104 to an exterior of the component.

The design of the hierarchical vasculature 108 is engineered to provide heat transport, thermal conductivity, and capillary pressure. In combination with the sacrificial transpirant 110, the hierarchical vasculature 108 is engineered to cool the component over the target operating temperature range so that the body 100 maintains a temperature that allows it to maintain structural integrity. The hierarchical vasculature 108 is formed by a plurality of branched lumens arranged in hierarchical levels, or stages, that are distributed through the thickness of the wall 106. The lumens are configured to act as capillaries to drive the flow of the transpirant. The levels can be defined by branch intersections 112 of the lumens, i.e., the locations where an output of a lumen splits into a plurality of downstream lumens, so that adjacent levels are joined by at least one branch intersection 112 of the branched lumens. The hierarchical vasculature 108 includes a plurality of levels. In various embodiments, the hierarchical includes 2-8 levels. In the exemplary embodiment illustrated in FIG. 2, the lumens of the hierarchical vasculature 108 are structured to include five levels, such as levels I-V. The innermost level of the hierarchical vasculature 108, e.g., level I, includes lumens that extend from the reservoir 104 toward the outer surface 102. The outermost level of the hierarchical vasculature 108, e.g., level V, includes lumens that intersect the outer surface 102 of the body 100 at a plurality of outlets. The intermediate levels that are disposed between the innermost level and the outermost level, e.g., levels II-IV, transition in size between the innermost level and the outermost level and provide continuous fluid communication between the innermost level and outermost level. That continuous fluid communication allows the transpirant to flow from the reservoir 104 through the outer surface 102 during operation. The radial dimension of the different levels, i.e., the lengths of the lumens in the levels, can vary so that the hierarchical vasculature 108 is fabricated across multiple length scales. As an alternative, the radial dimensions of the different levels can be approximately equal.

The sizes of the lumens in the hierarchical vasculature generally vary with the radial location of the lumens. The sizes of the lumens in the hierarchical vasculature 108 are selected to provide desired behavior of a liquid phase of the transpirant 110. For example, the innermost lumens are generally larger than the outermost lumens, and the sizes can be selected to so that capillary pressure drives the movement of the liquid phase of the transpirant 110 through the hierarchical vasculature 108. In an example embodiment, a pressure differential created across the hierarchical vasculature 108 by capillary pressure is at least 100 MPa. In another example embodiment, the pressure differential created across the hierarchical vasculature 108 by capillary pressure is less than 100 MPa. The size of the lumens can be measured using a cross-sectional area, an average diameter, a minimum diameter, a maximum diameter, etc. In an example embodiment, the average diameter (i.e., the average of the largest transverse internal dimension and the smallest transverse internal dimension of a lumen) is controlled to provide a size differential of the average diameters between the innermost level and the outermost level in a range between about 5 μm and 3000 μm. In another example embodiment, the average diameter is controlled to provide a size differential of the average diameters between the innermost level and the outermost level in a range between about 10 μm and about 1000 μm. The levels of the hierarchical vasculature can alternatively be defined by the size of the lumens. For example, the levels of the hierarchical vasculature 108 can be defined using a reference dimension (e.g., the cross-sectional area or other selected dimension) of the lumens and by assigning a range of the reference dimension to each level.

Different manufacturing techniques can be used to construct the body 100 and the hierarchical vasculature structure 108. The body 100 can be constructed using manufacturing processes such as a shell-making process (e.g., a partial investment casting processes), additive manufacturing processes including direct ink writing (DIW), stereolithography, selective laser melting, and combinations thereof. The selection of the manufacturing process, or processes, employed can be selected based on the size of the desired lumens and the available resolution of the manufacturing process.

At least some of the lumens can be defined by inter-grain porosity of the material of the body 100. For example, some desired lumen sizes that are below a lower threshold limit for a particular manufacturing process can be constructed using the porosity of a material. In an example, lumens smaller than 10s of micron (i.e., smaller than $1.0 \times 10^{-5}$ m) may be difficult to form directly, such as by using additive manufacturing, and the inter-grain porosity of a material may be utilized as lumens having smaller dimensions. In at least one embodiment, at least a portion of the body 100, such as level V, can be constructed from a granular material that results in the inter-grain porosity being equivalent to the grain size. In some embodiments, the inter-grain porosity can be used to form lumens having sizes in the 10s, or 100s, of nanometers (i.e., smaller than $1.0 \times 10^{-6}$ m). Different inter-grain porosity can be achieved by selecting the powder material, or combinations of powder materials, and by selecting appropriate densification, and/or other processing, techniques.

The reservoir 104 is configured to hold the transpirant 110 when the transpirant is in a solid phase and while the transpirant transitions into the liquid phase. The reservoir 104 is spaced from the outer surface 102 by a distance T corresponding to a thickness of a portion of the wall 106 of the body 100. The distance T is selected to provide sufficient distance to balance the heat transfer of the system and to provide space to construct the selected hierarchical vasculature 108. The reservoir 104 can also be sized to hold a volume of transpirant 110 to provide a desired lifetime of the semi-passive cooling system and a mass that is compatible with the mass budget of the component. For example, the volume of transpirant 110 can be selected to provide transpiration for a selected period of time during which the component experiences a selected operating temperature range. In some instances, the volume of transpirant can be selected to provide a margin of volume so that the transpirant is not fully exhausted during operation. In some embodiments, the volume is at least 10% greater than a required operating volume. The reservoir 104 can be formed in a variety of shapes and can be placed anywhere within the body 100 so that it is exposed to the heat flux $\phi_q$ required to subject the transpirant to phase transformation. In some embodiments, the reservoir 104 and the hierarchical vasculature 108 are located in the hottest region of the component. It should be appreciated that the reservoir 104 need not be solely in the form of a bulk reservoir, but may be formed using only a portion of the lumens, or alternatively, a hybrid by combining a portion of the lumens with a smaller bulk reservoir. The reservoir 104 can also be configured so that the transpirant 110 is completely sacrificed, i.e., the entire volume of transpirant 110 is exhausted during use of the semi-passive cooling system. It should further be appreciated that the reservoir can be configured to include at least one vent to permit the transpirant to be completely sacrificed without creating a pressure differential between the reservoir 104 and the hierarchical vasculature 108 that would inhibit the exhaustion of the sacrificial transpirant.

The body 100 material can be selected for the target operating temperature range based on the amount of cooling provided by the semi-passive cooling system. The heat transfer provided by the semi-passive cooling system of the present invention allows materials that could not normally be used in the same application to be used. In some examples, a more common metal alloy can substitute for a superalloy that would otherwise be required to maintain structural integrity. The body material can be selected from a variety of ceramics, metals, metal alloys, and composite materials. In various embodiments, the body 100 can be constructed from at least one of metal, metal alloy, carbon fiber composite, ceramic (e.g., a ultra-high temperature ceramic), ceramic-metal composite, or engineering polymers. Exemplary metallic materials that can be used to construct the body 100 include steel, titanium, aluminum, nickel alloys, superalloys (e.g., Hastelloy, Inconel, etc.), and refractory metals (e.g., tungsten, niobium, molybdenum, etc.). In various examples, an ultra-high temperature ceramic is selected so that the body can withstand temperatures exceeding 2000° C. Examples of ceramic materials that can be used include, but are not limited to, various borides, carbides, nitrides, and oxides. In some embodiments, the ceramic material is selected from $B_4C$, $ZrB_2$, ZrC, HfC, and $HfB_2$.

The transpirant 110 forms a sacrificial material that functions as a working fluid in the heat transfer system formed by the semi-passive cooling system. The transpirant 110 is selected, or tuned, to provide desired behavior in the hierarchical vasculature 108 for a target operating temperature range. In particular, the transpirant 110 is selected to provide a desired wetting angle, a desired heat capacity per unit volume, and melting and vaporization temperatures within the target operating temperature range. The transpirant 110 is selected to interact with the hierarchical vasculature 108 so that capillary pressure is highest in the outermost level while the capillary pressure is lowest in the innermost level of the hierarchical vasculature 108. Wetting is a phenomenon in which a liquid has a tendency to cover the surface of a solid, and a wetting liquid disposed in a capillary creates capillary pressure that results in the liquid climbing the walls of the capillary. In various embodiments, the transpirant is selected to provide a wetting angle with the body material that is in a range between about 0° and about 80°. In other embodiments, the transpirant is selected to provide a wetting angle that is in a range between about 10° and about 80°. In other embodiments, the transpirant is selected to provide a wetting angle with the body material that is less than about 60°. Selecting a transpirant 110 that provides melting and vaporization temperatures within the target operating range allows the semi-passive cooling system to utilize the latent heats of both melting and vaporization to cool the component. The transpirant 110 can be constructed from metals, metal alloys, polymers, and glasses. For example, the transpirant 110 can be selected from tin, lead, and gold. The transpirant 110 is not limited to a single species and can be an alloy.

The composition of the transpirant 110 can also be tuned to alter the melting and/or vaporization temperatures to the target operating temperature range of the component. In at least some embodiments, eutectoid mixtures are utilized to alter the melting temperature of a material to form a transpirant. Additionally, the composition of the transpirant 110 can be tuned to provide a desired wetting angle with the selected body material.

Figure 3:
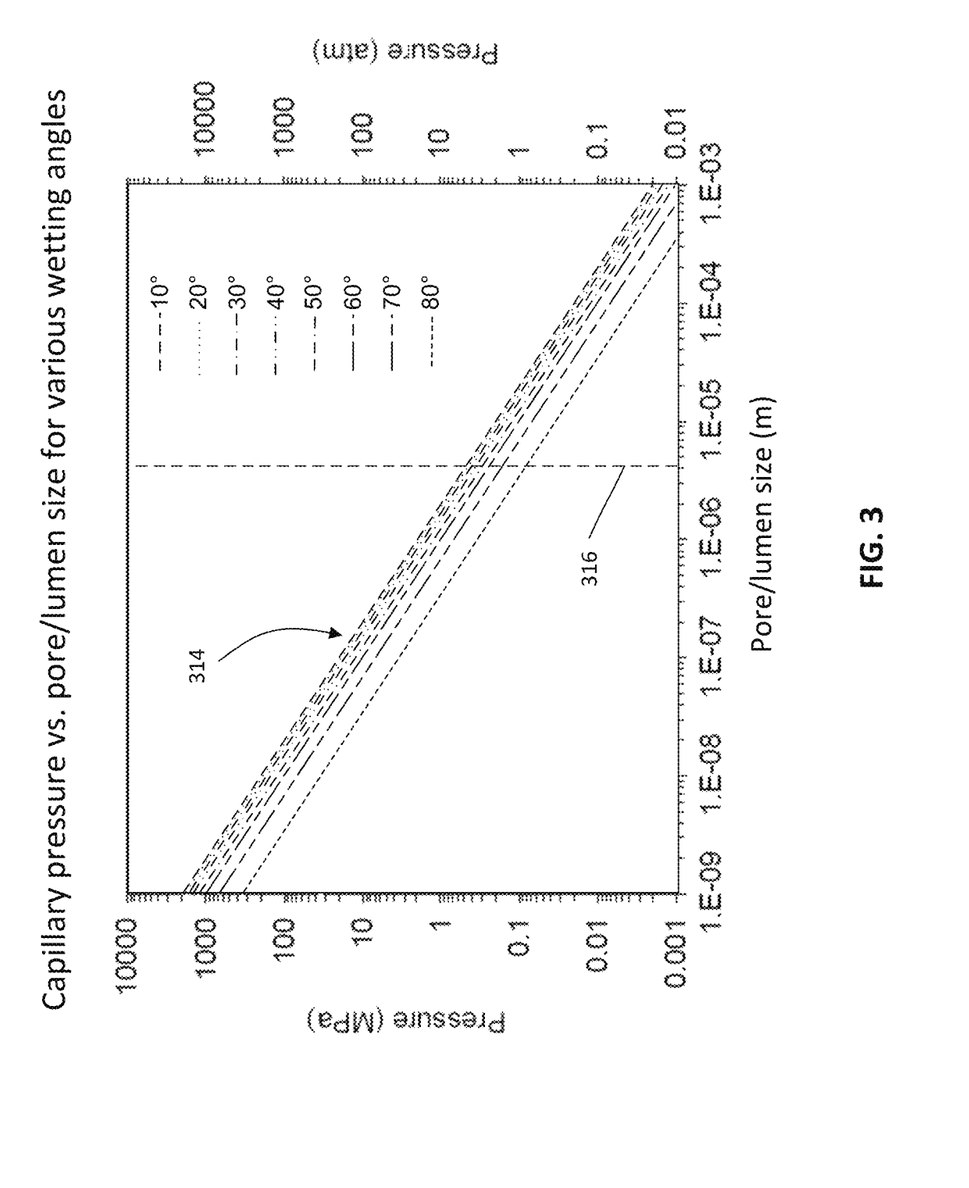
FIG. 3 is a log-log graph comparing capillary pressure and pore/lumen size for various wetting angles of the liquid phase of a transpirant.

The selection of the dimensions of the lumens in the hierarchical vasculature 108 in combination with the selection of the transpirant 110 can be used to achieve a desired capillary pressure in the semi-passive cooling system during operation. Referring to plot 314 shown in FIG. 3, capillary pressure is a function of pore/lumen size and wetting angle of a liquid in the pores/lumens. As shown in the graph, capillary pressure increases with a decrease in pore/lumen size for a given wetting angle when the pore/lumen size is less than about 1 mm according to the relationship of equation 1:

$$P_C = (2\gamma \cos \theta)/r \quad (1)$$

where "Pc" is capillary pressure (i.e., the difference in pressure across the fluid interface within a capillary), "γ" is the interfacial tension, "θ" is the wetting angle of the fluid, and "r" is the pore/lumen radius. For a given wetting angle, the plot 314 of capillary pressure varies approximately linearly with pore/lumen size in the log-log graph. Using capillary pressure calculations, the hierarchical vasculature 108 can be designed so that a change in capillary pressure drives flow of the liquid phase of the transpirant towards the outer surface 102. Additionally, the graph of FIG. 3 illustrates an exemplary limitation 316 of some advanced manufacturing methods that indicates a lower threshold limit for pore/lumen size at approximately $4.0 \times 10^{-6}$ m. The exemplary limitation 316 generally indicates sizes of the lumens in the hierarchical vasculature that are below the lower limits of those advanced manufacturing methods, but at which inter-grain porosity can be used to form smaller lumens in the hierarchical vasculature. The exemplary limitation 316 is intended to illustrate that manufacturing methods can be combined with inter-grain porosity to construct a hierarchical vasculature having a range of lumen sizes. It should be appreciated that the lower threshold limit is dependent on the manufacturing methods employed and can be present at a size larger or smaller than that shown in FIG. 3.

Figure 4:
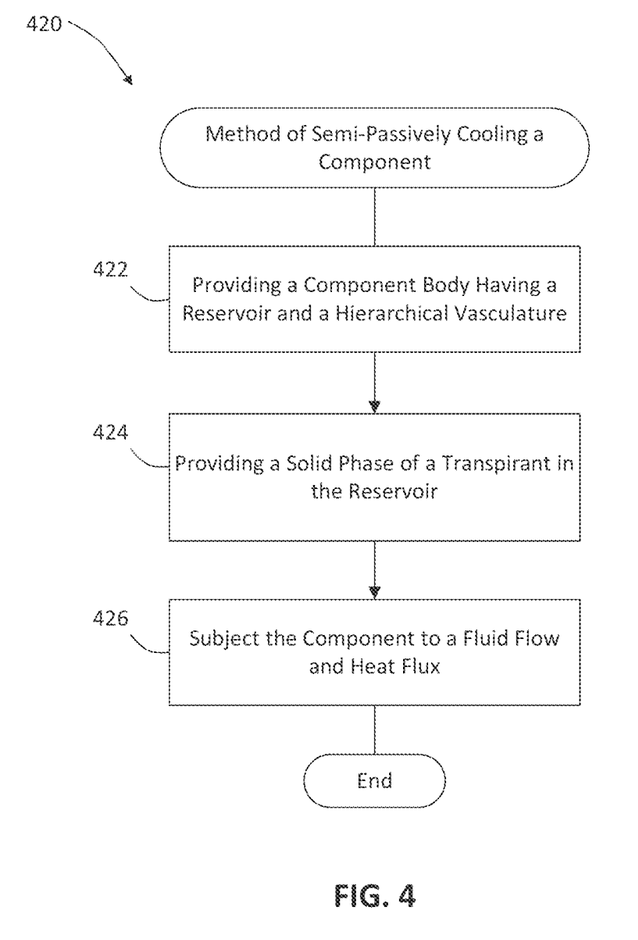
FIG. 4 is a flowchart showing a method of semi-passively cooling a component in accordance with an embodiment.

FIG. 4 depicts a flowchart 420 of an example method of semi-passively cooling a component in accordance with at least one embodiment. The method of flowchart 420 can be used to cool a component that is exposed to a fluid flow Q and heat flux $\phi_q$ to reduce the body temperature of the component. The method will be described with reference to the schematics of FIGS. 5 and 6. It should be appreciated that the method can be performed using the components described herein, including the component shown in FIGS. 1 and 2. Further compositional, structural, and operational embodiments will be apparent to persons skilled in the relevant art(s) based on the discussion regarding flowchart 420.

Figure 5:
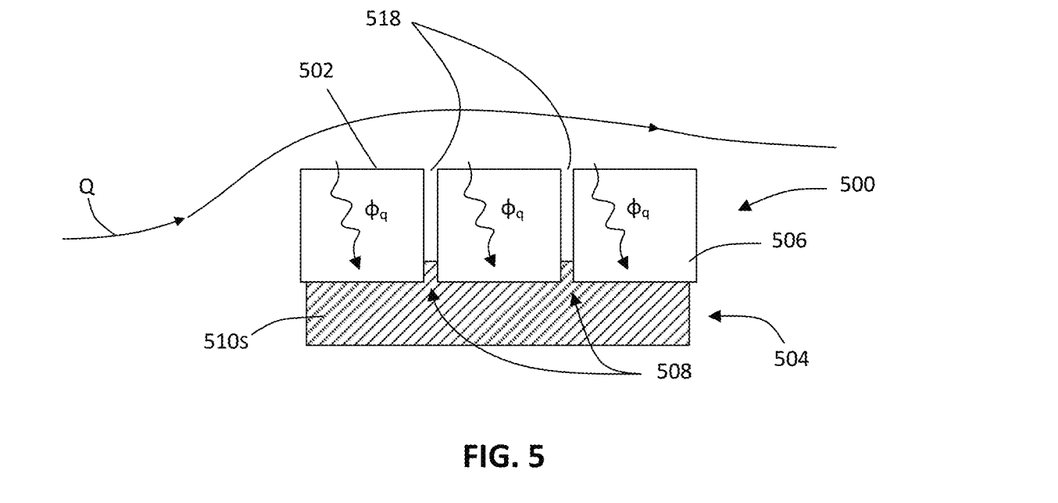
FIG. 5 is a schematic view of a semi-passive cooling system in accordance with an embodiment.
Figure 6:
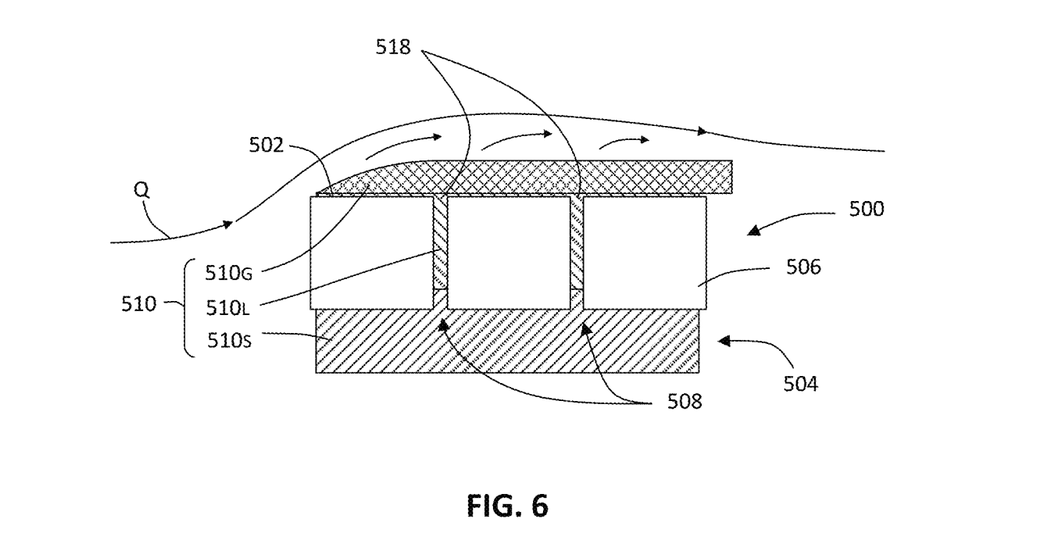
FIG. 6 is another schematic view of the semi-passive cooling system of FIG. 5.

As shown in FIG. 4, the method of flowchart 420 begins at step 422. In step 422, a component body having a reservoir and a hierarchical vasculature is provided. For example, a body, such as body 500 shown in FIGS. 5 and 6, is provided that includes a wall 506 defining plurality of lumens that form a hierarchical vasculature 508. The hierarchical vasculature 508 extends between an outer surface 502 and a reservoir 504.

At step 424, a solid phase of a transpirant is provided in the reservoir. For example, a solid phase of a sacrificial transpirant 510s is disposed in the reservoir 504. It should be appreciated that the transpirant can be loaded into the reservoir while it is in another phase, such as a liquid or vapor phase, and then cooled to a solid phase prior to operation of the semi-passive cooling system.

At step 426, the component is subjected to a fluid flow. The exposure of the component to the fluid flow Q results in heat flux $\phi_q$ being generated that travels through the wall of the component and into the transpirant. For example, when the body 500 is exposed to fluid flow Q, the heat flux $\phi_q$ that is generated travels through the wall 506 and heats the transpirant 510. As the temperature of the transpirant 510 increases toward the melting temperature of the transpirant 510, at least a portion of the transpirant 510 undergoes a phase change from the initial solid phase 510s into a liquid phase 510. The semi-passive cooling system advantageously utilizes the latent heat of transformation to increase the heat transfer from the body 500.

As shown in FIG. 6, the liquid phase $510_L$ of the transpirant flows through the hierarchical vasculature 508. As the transpirant 510 approaches outlets, or openings, 518, i.e. where the lumens of the outermost level of the hierarchical vasculature 508 intersect the outer surface 502, the liquid phase $510_L$ is subjected to additional heat flux that further transforms the liquid phase $510_L$ into a vapor, or gaseous, phase 510. As a result, the semi-passive cooling system advantageously utilizes a second phase transformation and the corresponding latent heat of transformation to increase the heat transfer from the body 500. The exposure of the vapor phase $510_G$ directly to the fluid flow Q results in the transpirant 510 being carried away so that it is sacrificed, or jettisoned, from the component.

Figure 7:
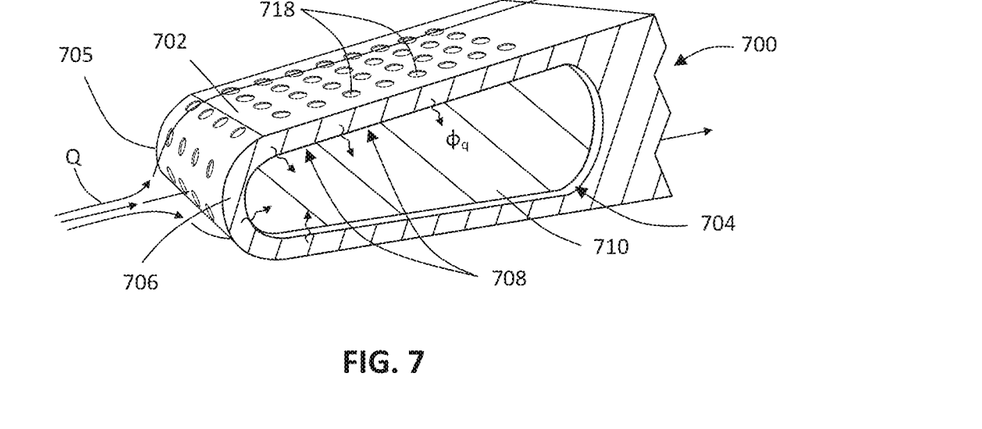
FIG. 7 is a cross-sectional view of a portion of a component in a fluid flow, in accordance with another embodiment.
Figure 8:
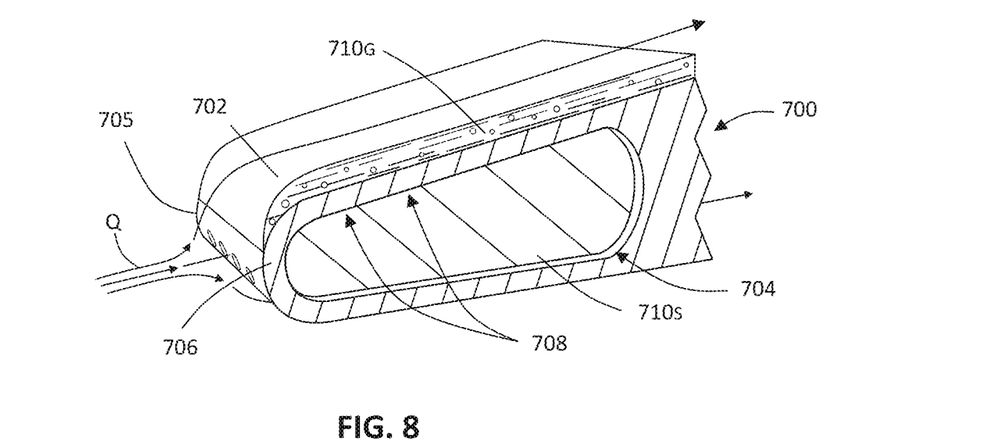
FIG. 8 is another cross-sectional view of the portion of the component of FIG. 7.

Referring now to FIGS. 7 and 8, a component including a semi-passive cooling system in accordance with an embodiment can be constructed as an airfoil. For example, a body 700 of the component is constructed so that it defines an outer surface 702, a reservoir 704, and a leading edge 705. The outer surface 702 includes a leading edge surface that is interposed between an upper surface and a lower surface and is exposed to a fluid flow Q. The fluid flow Q travels over the component and applies pressure to the outer surface 702 and generates heat flux $\phi_q$ in at least a portion of the body 700. A portion of a wall 706 of the body 700 extends between the reservoir 704 and the outer surface 702. As shown in FIG. 7, a portion of the wall 706 disposed adjacent the leading edge 705 is constructed to define a hierarchical vasculature 708 that extends between the reservoir 704 and the outer surface 702 to form a fluid pathway for a transpirant 710 disposed in the reservoir 704 to flow to an exterior of the component.

The body 700 can be configured to include the hierarchical vasculature 708 in any portion of the wall 706 and the hierarchical vasculature 708 can intersect the outer surface 702 at any desired location. The hierarchical vasculature 708 is configured so that a plurality of outlets, or openings, 718 of an outermost level of the hierarchical vasculature 708 are provided in selected portions of the outer surface 702. In an example, the hierarchical vasculature 708 is configured so that the outlets 718 are positioned in locations where the capillary pressure of the transpirant 710 at the outlets is greater than fluid pressure on the outer surface 702 resulting from the fluid flow Q for a target operating environment. The target operating environment can be defined by geometry of the component, speed of the fluid flow, and fluid density. In an example embodiment, the outlets are spaced from the leading edge of the body so that the outlets are spaced from a stagnation point, and corresponding stagnation pressure and stagnation temperature. The stagnation temperature can be several thousand degrees higher than other portions of the component or a vehicle incorporating the component, when the component is subjected to the fluid flow. Even in embodiments in which the outlets of the hierarchical vasculature are spaced from the leading edge, any portion of the remainder of the semi-passive cooling system can be located adjacent to the leading edge so that at least a portion of the cooling system is located within the hottest region of the component. As a result, the cooling system can simplify integration in a complex airfoil structure by concentrating its components into a relatively small region of the component.

As shown in FIG. 8, when the body 700 is exposed to fluid flow Q, heat flux $\phi_q$ is generated that travels through the wall 706 and heats the transpirant 710. As the temperature of the transpirant 710 increases toward the melting temperature of the transpirant 710, at least a portion of the transpirant 710 undergoes a phase change from the initial solid phase $710_S$ into a liquid phase. The semi-passive cooling system advantageously utilizes the latent heat of transformation to increase the heat transfer from the body 700. The liquid phase of the transpirant 710 flows through the hierarchical vasculature 708. As the transpirant 710 approaches outlets 718, the liquid phase further transforms from the liquid phase into the vapor phase 710. As a result, the semi-passive cooling system advantageously utilizes a second phase transformation, and the corresponding latent heat of transformation, to increase the heat transfer from the body 700. The exposure of the vapor phase $710_G$ directly to the fluid flow Q results in the transpirant 710 being carried away so that it is sacrificed from the component.

Additionally, the vapor phase $710_G$ of the transpirant 710 can be used to shield the outer surface 702 of the body 700. For example, the vapor phase $710_G$ can form a film layer adjacent the outer surface that can be used to shield the material of the outer surface 702 from reactive atmospheric gas species in an aerothermal environment, such as preventing the formation of new phases from reaction of the outer surface with atmospheric gas species such as O, N, H or C. The vapor phase $710_G$ can form a thermally and chemically insulating layer between the component and the environment that can prevent ablation of the outer surface 702, reduce corrosion/oxidation and protect it from other undesirable effects.

Figure 9:
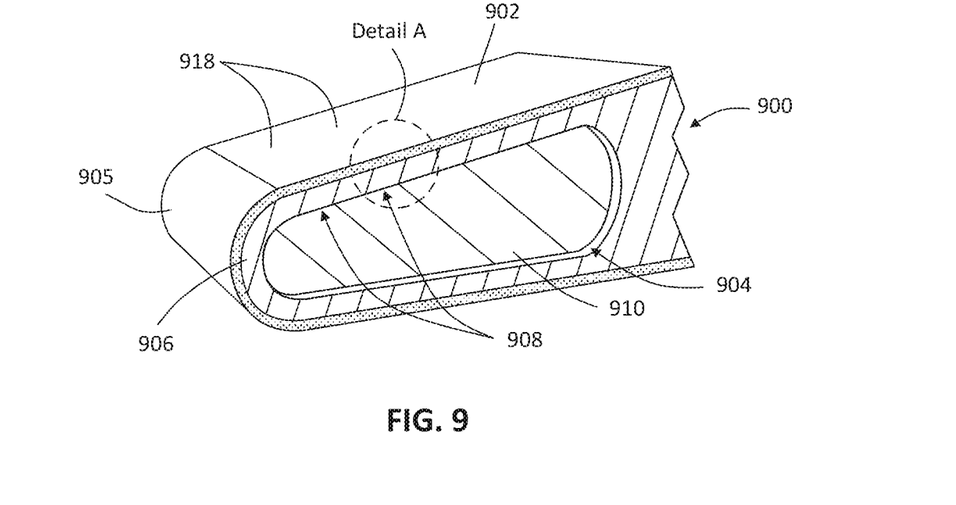
FIG. 9 is a cross-sectional view of a portion of a component including a semi-passive cooling system in accordance with another embodiment.
Figure 10:
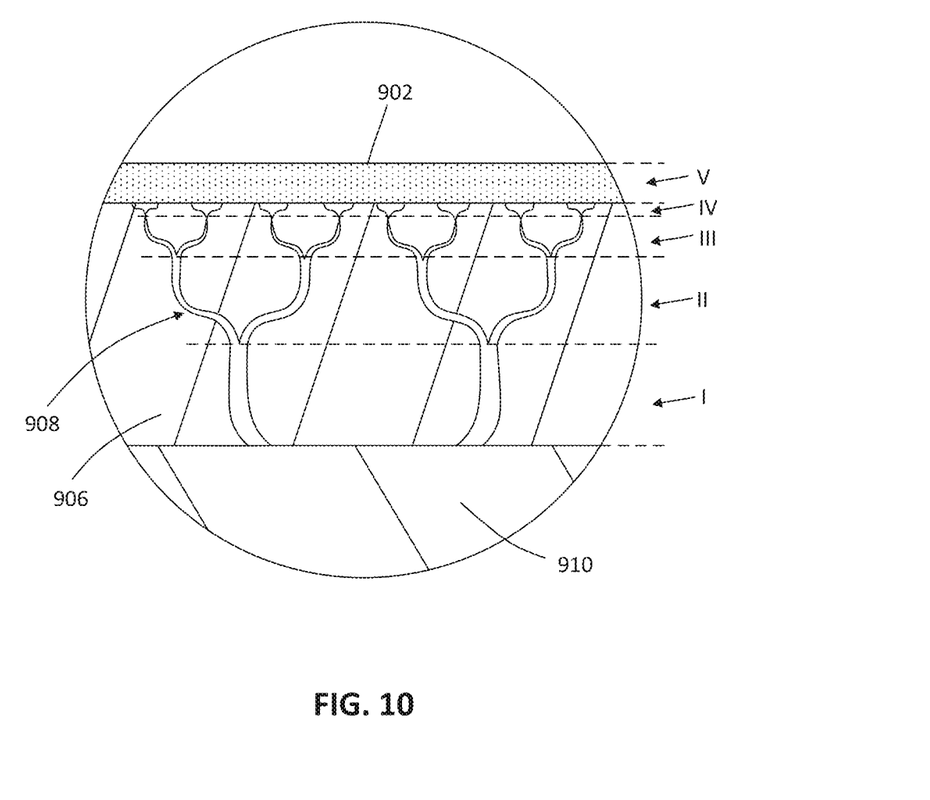
FIG. 10 is a cross-sectional view of a portion, corresponding to Detail A, of the component of FIG. 9.

Referring to FIGS. 9 and 10, another embodiment of a component constructed as an airfoil and including a semi-passive cooling system is shown. In particular, a body 900 of the component is constructed so that it defines an outer surface 902, a reservoir 904, and a leading edge 905. The outer surface 902 includes a leading edge surface that is interposed between an upper surface and a lower surface and is configured to be exposed to a fluid flow. During operation, the fluid flow travels over the component and applies pressure to the outer surface 902 and generates heat flux $\phi_q$ in at least a portion of the body 900. A portion of a wall 906 of the body 900 extends between the reservoir 904 and the outer surface 902. At least a portion of the wall 906 is constructed to define a hierarchical vasculature 908 that extends between the reservoir 904 and the outer surface 902 to form a pathway for a transpirant 910 disposed in the reservoir 904 to flow to an exterior of the component.

The body 900 can be configured to include the hierarchical vasculature 908 in any portion of the wall 906 and the hierarchical vasculature 908 can intersect the outer surface 902 at any desired location. In particular, the hierarchical vasculature 908 can be configured so that a plurality of outlets 918 of an outermost level of the hierarchical vasculature 908 are provided in selected portions of the outer surface 902. The hierarchical vasculature 908 can be configured to include a plurality of levels including an innermost level coupled to the reservoir 904 and an outermost level intersecting the outer surface 902. In the illustrated embodiment, the hierarchical vasculature is constructed with five levels, e.g., levels I-V, and the outermost level V is constructed so that the lumens are formed by inter-grain porosity. The hierarchical vasculature 908 and corresponding porous outlets 918 can be positioned as desired in the wall 906. In an example, the hierarchical vasculature 908 is positioned in locations where the capillary pressure of the transpirant 910 at the outlets 918 is greater than fluid pressure on the outer surface 902 resulting from the fluid flow Q for a target operating environment.

Figure 11:
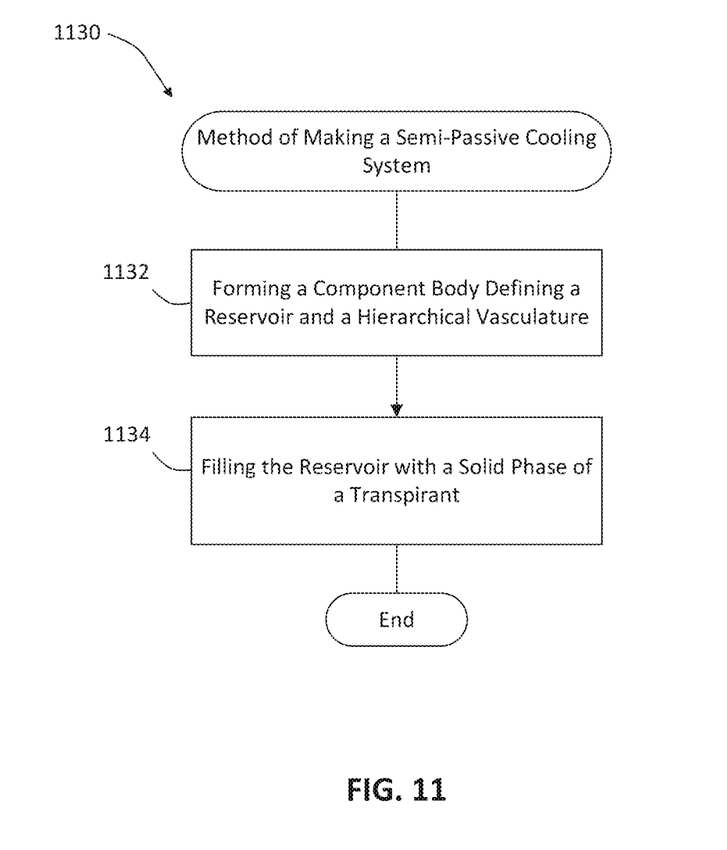
FIG. 11 is a flowchart showing a method making a semi-passive cooling system in accordance with an embodiment.

FIG. 11 depicts a flowchart 1130 of an example method of making a semi-passive cooling system in accordance with at least one embodiment. The method of flowchart 1130 can be used to construct a semi-passive cooling system such as the semi-passive cooling systems described herein with reference to FIGS. 1 and 2, FIGS. 7 and 8, and FIGS. 9 and 10. Further compositional, structural, and operational embodiments will be apparent to persons skilled in the relevant art(s) based on the discussion regarding flowchart 1130.

As shown in FIG. 11, the method of flowchart 1130 begins at step 1132. In step 1132, a component body defining a reservoir and a hierarchical vasculature is formed. For example, a body, such as body 100 shown in FIGS. 1 and 2, that includes the wall 106 defining the reservoir 104 and the plurality of lumens that form the hierarchical vasculature 108 is formed.

Figure 12:
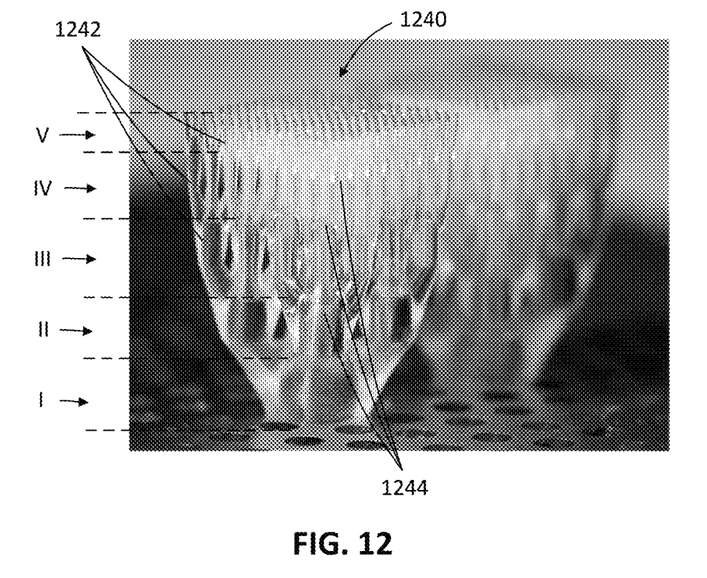
FIG. 12 is an image of an exemplary pattern for forming a hierarchical vasculature in accordance with an embodiment.
Figure 13:
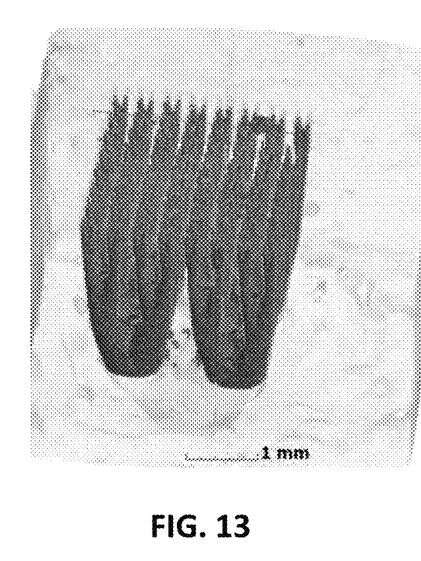
FIG. 13 is a micro CT scan image of a body constructed with a hierarchical vasculature using the pattern shown in FIG. 11.

Referring to FIGS. 12 and 13, a shell-making process, such as a shell-making process utilized as a portion of an investment casting process, can be used to form the body. For example, a pattern 1240 can be constructed using an additive manufacturing process, such as a DIW process. The pattern 1240 is formed with the geometry of a desired void space provided by an engineered hierarchical vasculature from a pattern material. In effect, the pattern 1240 is formed as a negative of the engineered hierarchical vasculature. The pattern 1240 includes a branched structure of columns 1242 that have varying sizes, and that will correspond to lumens in the formed body. The columns 1242 are coupled at a plurality of branch intersection 1244 that define a plurality of levels. In the illustrated pattern 1240, the branch intersections 1244 define five levels, i.e., levels I-V, with the smallest columns having an approximate diameter of about 200 µm. The pattern 1240 can be formed from any fugitive material that can be dissolved out, burned away, etc. For example, the pattern 1240 can be constructed from UV curable resins (e.g., photopolymers), plastics (e.g., ABS), wax, low-temperature metals (e.g., tin), etc. In other embodiments, the pattern could be constructed, at least in part from the transpirant material or reaction constituents.

After the pattern 1240 is formed, the pattern 1240 is encased by a selected body material to construct a body pre-form structure. For example, the body material, or a body material precursor, can be deposited on the pattern 1240 such as by depositing a slurry that includes the body material onto the pattern 1240. Alternatively, the body material can be cast around the pattern 1240, preferably at a temperature below a melting temperature of the pattern material. After the pattern 1240 is encased by the selected body material, the body pre-form structure can be processed, such as to cure and/or densify the body material. The pattern material is removed from the body material during the processing of the body pre-form structure or in another operation.

After the pattern material is removed and processing of the body material is completed, the final body is formed that defines void space corresponding to the engineered hierarchical vasculature. In an example embodiment, a plurality of patterns, such as pattern 1240, were combined to form a component body having the engineered hierarchical vasculature. A micro CT scan of a portion of a body 1300 constructed using a plurality of patterns, such as pattern 1240, is illustrated in FIG. 13. The scan illustrates that the body 1300 defines a void space having the same shape as the plurality of patterns to define a hierarchical vasculature 1308 in the body 1300. Additionally, it should be appreciated that the body 1300 is constructed to include a reservoir (not shown) that is configured to be filled with a volume of transpirant.

Referring back to FIG. 11, at step 1134, a reservoir of the component body is filled with a solid phase of a transpirant. The reservoir can be filled using a variety of methods, including inserting a body of the transpirant in the solid phase into the reservoir. Alternatively, the reservoir can be filled by infiltrating the reservoir with a liquid phase of the transpirant and allowing the transpirant to cool in the reservoir into a solid phase.

The component including the semi-passive cooling system can be configured for many different devices. In some embodiments, the component can be a portion of a sensor probe that is exposed to a fluid flow. For example, the component can form a portion of a temperature or pressure sensor included in a fluid pipeline. In other embodiments, the component can be included in a vehicle that is exposed to a fluid flow. For example, the component including configurations of the semi-passive cooling system can form a portion of an airfoil, a control surface, a fuselage, or any other portion of an aircraft subjected to atmospheric flight, such as high speed atmospheric flight, that requires cooling.

The inventive concepts disclosed herein have been presented by way of example to illustrate the myriad features thereof in a plurality of illustrative scenarios, aspects, and/or implementations. It should be appreciated that the concepts generally disclosed are to be considered as modular, and may be implemented in any combination, permutation, or synthesis thereof. In addition, any modification, alteration, or equivalent of the presently disclosed features, functions, and concepts that would be appreciated by a person having ordinary skill in the art upon reading the instant descriptions should also be considered within the scope of this disclosure.

While various aspects have been described above, it should be understood that they have been presented by way of example only, and not limitation. Thus, the breadth and scope of an aspect of the present invention should not be limited by any of the above-described exemplary aspects, but should be defined only in accordance with the following claims and their equivalents.

III. Further Discussion of Some Example Embodiments (A1) A semi-passive cooling system for a component exposed to fluid flow and heat flux comprises a body (e.g., FIG. 1, 100) and a sacrificial transpirant (e.g., FIG. 1, 110). The body defines an outer surface (e.g., FIG. 1, 102), a transpirant reservoir (e.g., FIG. 1, 104), and a hierarchical vasculature (e.g., FIG. 1, 108) extending from the transpirant reservoir and through at least a portion of the outer surface. The sacrificial transpirant is disposed in the transpirant reservoir in a solid phase, and the transpirant is configured to transition between the solid phase and a vapor phase over an operating temperature range of the component.

(A2) In the semi-passive cooling system of A1, where the hierarchical vasculature is configured to drive a liquid phase of the transpirant through the hierarchical vasculature by capillary pressure.

(A3) In the semi-passive cooling system of A1-A2, where the hierarchical vasculature is defined by a plurality of branched lumens, the branched lumens define a plurality levels of the hierarchical vasculature, and adjacent levels of the hierarchical vasculature are joined by at least one branch intersection (e.g., FIG. 1, 112) of the branched lumens.

(A4) In the semi-passive cooling system of A3, where the hierarchical vasculature includes at least 3 levels (e.g., FIG. 2, I-V).

(A5) In the semi-passive cooling system of A3, where at least one of the levels of the hierarchical vasculature is defined by inter-grain porosity of a body material.

(A6) In the semi-passive cooling system of A3, where the hierarchical vasculature is defined by at least an innermost level and an outermost level. The innermost level is in fluid communication with the transpirant reservoir. The outermost level intersects the outer surface. A size differential between the innermost level and the outermost level is in a range between 10 µm and 1000 µm.

(A7) In the semi-passive cooling system of A1-A3, where the hierarchical vasculature is defined by a plurality of branched lumens. A size of the branched lumens is tapered between the transpirant reservoir and the outer surface so that a capillary pressure of a liquid phase of the transpirant in the hierarchical vasculature increases from the transpirant reservoir to the outer surface.

(A8) In the semi-passive cooling system of A7, where the capillary pressure of the liquid phase of the transpirant has a pressure differential of at least 100 MPa in the hierarchical vasculature.

(A9) In the semi-passive cooling system of A1-A3 and A7, where the transpirant is constructed from at least one of a metal, a metal alloy, a polymer, or a glass.

(A10) In the semi-passive cooling system of A9, where the transpirant is at least one of tin, lead, or gold.

(A11) In the semi-passive cooling system of A1-A3, A7, and A9, where the liquid phase of the transpirant has a wetting angle in a range between 10° and 80°.

(A12) In the semi-passive cooling system of A1-A3, A7, A9, and A11, where the body is constructed from at least one of a metal, a metal alloy, a carbon fiber composite, a ceramic, a ceramic-metal composite, or a polymer.

(A13) In the semi-passive cooling system of A12, where the body is constructed from at least one of steel, titanium, aluminum, nickel alloy, Hastelloy, Inconel, tungsten, niobium, molybdenum, or ultra-high temperature ceramic.

(B1) A semi-passive cooling system for a component exposed to a fluid flow and aerodynamic heating comprises a body (e.g., FIG. 1, 100) and a sacrificial transpirant (e.g., FIG. 1, 110). The body defines an outer surface (FIG. 1, 102), a transpirant reservoir (e.g., FIG. 1, 104), and a hierarchical vasculature (e.g., FIG. 1, 108). The hierarchical vasculature extends between the transpirant reservoir and at least a portion of the outer surface. The hierarchical vasculature intersects the outer surface a plurality of outlets (e.g., FIG. 5, 518). The sacrificial transpirant is disposed in the transpirant reservoir in a solid phase and is configured to transition between the solid phase and a vapor phase over a temperature gradient extending over the hierarchical vasculature caused by the aerodynamic heating. The outlets are located so that a capillary pressure of a liquid phase of the transpirant at the outlets is greater than a fluid pressure exerted on the outer surface by the fluid flow.

(B2) In the semi-passive cooling system of B1, where the hierarchical vasculature is defined by a plurality of branched lumens. The branched lumens define a plurality of levels of the hierarchical vasculature. Adjacent levels are joined by at least one branch intersection (e.g., FIG. 1, 112) of the branched lumens.

(B3) In the semi-passive cooling system of B2, where at least one of the levels of the hierarchical vasculature is defined by inter-grain porosity.

(B4) In the semi-passive cooling system of B2, where the hierarchical vasculature is defined by at least an innermost level and an outermost level. The innermost level is in fluid communication with the transpirant reservoir. The outermost level intersects the outer surface. A size differential between the innermost level and the outermost level is in a range between 10 μm and 1000 μm.

(B5) In the semi-passive cooling system of B1-B2, where the hierarchical vasculature is defined by a plurality of branched lumens. A size of the branched lumens is tapered between the transpirant reservoir and the outer surface so that a capillary pressure of a liquid phase of the transpirant in the hierarchical vasculature increases from the transpirant reservoir to the outer surface. The capillary pressure of the liquid phase of the transpirant has a pressure differential of at least 100 MPa in the hierarchical vasculature.

(C1) A method of making a semi-passive cooling system in a component comprises forming a body (e.g., FIG. 1, 100) including a transpirant reservoir (e.g., FIG. 1, 104) and filling the transpirant reservoir with a sacrificial transpirant (e.g., FIG. 1, 110). The body is formed from a first material and includes the transpirant reservoir and an outer surface. The body defines a hierarchical vasculature (e.g., FIG. 1, 108) extending between the transpirant reservoir and the outer surface. The transpirant reservoir is filled with the sacrificial transpirant in a solid phase. The transpirant is configured to transition between the solid phase and a vapor phase over an operating temperature range of the component.

(C2) In the method of making a semi-passive cooling system of C1, where the body is formed from the first material by at least one of additive manufacturing and a shell-making process.

What is claimed is:

1. A semi-passive cooling system for a component exposed to fluid flow and heat flux, comprising:
   a body defining:
   an outer surface,
   a transpirant reservoir, and
   a hierarchical vasculature communicating with, and extending from, the transpirant reservoir, and through at least a portion of the outer surface, to communicate with the outer surface of the body; and
   a sacrificial transpirant disposed in the transpirant reservoir in a solid phase, wherein the transpirant is configured to transition between the solid phase and a vapor phase over an operating temperature range of the component.

2. The semi-passive cooling system of claim 1, wherein the hierarchical vasculature is configured to drive a liquid phase of the transpirant through the hierarchical vasculature by capillary pressure.

3. The semi-passive cooling system of claim 1, wherein the hierarchical vasculature is defined by a plurality of branched lumens, wherein the branched lumens define a plurality levels of the hierarchical vasculature, and wherein adjacent levels of the hierarchical vasculature are joined by at least one branch intersection of the branched lumens.

4. The semi-passive cooling system of claim 3, wherein the hierarchical vasculature includes at least 3 levels.

5. The semi-passive cooling system of claim 3, wherein at least one of the levels of the hierarchical vasculature is defined by inter-grain porosity of a body material.

6. The semi-passive cooling system of claim 3, wherein the hierarchical vasculature is defined by at least an innermost level and an outermost level, wherein the innermost level is in fluid communication with the transpirant reservoir, wherein the outermost level intersects the outer surface, and wherein a size differential between the innermost level and the outermost level is in a range between 10 μm and 1000 μm.

7. The semi-passive cooling system of claim 1, wherein the hierarchical vasculature is defined by a plurality of branched lumens, and wherein a size of the branched lumens is tapered between the transpirant reservoir and the outer surface so that a capillary pressure of a liquid phase of the transpirant in the hierarchical vasculature increases from the transpirant reservoir to the outer surface.

8. The semi-passive cooling system of claim 7, wherein the capillary pressure of the liquid phase of the transpirant has a pressure differential of at least 100 MPa in the hierarchical vasculature.

9. The semi-passive cooling system of claim 1, wherein the transpirant is constructed from at least one of a metal, a metal alloy, a polymer, or a glass.

10. The semi-passive cooling system of claim 9, wherein the transpirant is at least one of tin, lead, or gold.

11. The semi-passive cooling system of claim 1, wherein a liquid phase of the transpirant has a wetting angle in a range between 10° and 80°.

12. The semi-passive cooling system of claim 1, wherein the body is constructed from at least one of a metal, a metal alloy, a carbon fiber composite, a ceramic, a ceramic-metal composite, or a polymer.

13. The semi-passive cooling system of claim 12, wherein the body is constructed from at least one of steel, titanium, aluminum, nickel alloy, Hastelloy, Inconel, tungsten, niobium, molybdenum, or ultra-high temperature ceramic.

14. A semi-passive cooling system for a component exposed to a fluid flow and aerodynamic heating, comprising:
   a body defining an outer surface, a transpirant reservoir, and a hierarchical vasculature extending between the transpirant reservoir and at least a portion of the outer surface, and being coupled to the transpirant reservoir and extending therefrom, wherein the hierarchical vasculature intersects and communicates with the outer surface at a plurality of outlets; and
   a sacrificial transpirant disposed in the transpirant reservoir in a solid phase, wherein the transpirant is configured to transition between the solid phase and a vapor phase over a temperature gradient extending over the hierarchical vasculature caused by the aerodynamic heating,
   wherein the outlets are located so that a capillary pressure of a liquid phase of the transpirant at the outlets is greater than a fluid pressure exerted on the outer surface by the fluid flow to drive the liquid phase out through the at least a portion of the outer surface.

15. The semi-passive cooling system of claim 14, wherein the hierarchical vasculature is defined by a plurality of branched lumens, wherein the branched lumens define a plurality of levels of the hierarchical vasculature, and wherein adjacent levels are joined by at least one branch intersection of the branched lumens.

16. The semi-passive cooling system of claim 15, wherein at least one of the levels of the hierarchical vasculature is defined by inter-grain porosity.

17. The semi-passive cooling system of claim 15, wherein the hierarchical vasculature is defined by at least an innermost level and an outermost level, wherein the innermost level is in fluid communication with the transpirant reservoir, and wherein the outermost level intersects the outer surface, and wherein a size differential between the innermost level and the outermost level is in a range between 10 µm and 1000 µm.

18. The semi-passive cooling system of claim 14, wherein the hierarchical vasculature is defined by a plurality of branched lumens, wherein a size of the branched lumens is tapered between the transpirant reservoir and the outer surface so that a capillary pressure of a liquid phase of the transpirant in the hierarchical vasculature increases from the transpirant reservoir to the outer surface, and wherein the capillary pressure of the liquid phase of the transpirant has a pressure differential of at least 100 MPa in the hierarchical vasculature.

19. A method of making a semi-passive cooling system in a component, comprising:
   forming a body from a first material, the body including a transpirant reservoir and an outer surface, wherein the body defines a hierarchical vasculature extending between the transpirant reservoir and the outer surface, and the hierarchical vasculature is coupled to the transpirant reservoir and extends therefrom, and communicates with the outer surface of the body, and
   filling the transpirant reservoir with a sacrificial transpirant in a solid phase, wherein the transpirant is configured to transition between the solid phase and a vapor phase over an operating temperature range of the component.

20. The method of claim 19, wherein the body is formed from the first material by at least one of additive manufacturing and a shell-making process.

* * * * *